United States Patent
Dvinov et al.

(10) Patent No.: US 11,256,690 B2
(45) Date of Patent: *Feb. 22, 2022

(54) USING ROW VALUE CONSTRUCTOR (RVC) BASED QUERIES TO GROUP RECORDS OF A DATABASE FOR MULTI-THREAD EXECUTION

(71) Applicant: salesforce.com, inc., San Francisco, CA (US)

(72) Inventors: Danil Dvinov, Oakland, CA (US); Parth Vijay Vaishnav, Newark, CA (US); Chenghung Ker, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/855,671

(22) Filed: Apr. 22, 2020

(65) Prior Publication Data

US 2020/0250189 A1 Aug. 6, 2020

Related U.S. Application Data

(63) Continuation of application No. 15/884,322, filed on Jan. 30, 2018, now Pat. No. 10,671,604.

(51) Int. Cl.
*G06F 16/30* (2019.01)
*G06F 16/2453* (2019.01)
(Continued)

(52) U.S. Cl.
CPC ...... *G06F 16/24532* (2019.01); *G06F 16/244* (2019.01); *G06F 16/2462* (2019.01)

(58) Field of Classification Search
CPC ............ G06F 16/24532; G06F 16/244; G06F 16/2462
(Continued)

(56) References Cited

U.S. PATENT DOCUMENTS 6,775,682 B1 * 8/2004 Ballamkonda .... G06F 16/24556
7,730,478 B2 6/2010 Weissman
(Continued)

OTHER PUBLICATIONS

Notice of Allowance, U.S. Appl. No. 15/884,322, dated Jan. 23, 2020, 9 pages.
(Continued)

*Primary Examiner* — Sana A Al-Hashemi
(74) *Attorney, Agent, or Firm* — Nicholson De Vos Webster & Elliott LLP

(57) ABSTRACT

Methods for splitting a plurality of records into subsets for parallel processing by separate threads are disclosed. In one embodiment, a plurality of records are added to a database. The adding includes tracking, for each unique value found in the plurality of records within a selected one of the sequence of fields, a statistic based on the values found in the plurality of records within a next one of the sequence of fields. Then a plurality of queries are generated, each includes a row value constructor (RVC) with a logical operation, a specific one of the unique values found within the selected one of the sequence of fields, and, for that specific value, the tracked statistic. Then a plurality of threads are caused to execute that each submit one of the queries and operate on a subset of the plurality of records responsive to execution of that query.

20 Claims, 7 Drawing Sheets

(51) Int. Cl.
*G06F 16/242* (2019.01)
*G06F 16/2458* (2019.01)

(58) Field of Classification Search
USPC ........ 707/609, 687, 705, 769, 790, 813, 822
See application file for complete search history.

(56) References Cited

U.S. PATENT DOCUMENTS

| | | | |
|---|---|---|---|
| 8,782,605 | B2 | 7/2014 | Dvinov et al. |
| 9,098,365 | B2 | 8/2015 | Smith et al. |
| 9,740,743 | B2 | 8/2017 | Jagota et al. |
| 10,152,497 | B2 | 12/2018 | Doan et al. |
| 10,235,476 | B2 | 3/2019 | Vaishnav et al. |
| 10,237,336 | B2 | 3/2019 | Dvinov et al. |
| 10,387,388 | B2 | 8/2019 | Doan et al. |
| 10,521,406 | B2 | 12/2019 | Vaishnav et al. |
| 2008/0126347 | A1* | 5/2008 | Mori ................... G06F 16/2465 |
| 2011/0125704 | A1* | 5/2011 | Mordvinova ....... G06F 16/2272 |
| | | | 707/600 |
| 2012/0066672 | A1 | 3/2012 | Smith et al. |
| 2017/0242868 | A1 | 8/2017 | Doan et al. |
| 2017/0242891 | A1 | 8/2017 | Doan et al. |
| 2017/0286441 | A1 | 10/2017 | Doan et al. |
| 2017/0293629 | A1 | 10/2017 | Doan et al. |
| 2018/0025038 | A1 | 1/2018 | Semlani et al. |
| 2018/0096003 | A1 | 4/2018 | Vaishnav et al. |
| 2018/0129686 | A1 | 5/2018 | Vaishnav |
| 2018/0189792 | A1 | 7/2018 | Vaishnav et al. |
| 2019/0236184 | A1* | 8/2019 | Dvinov ............. G06F 16/24532 |
| 2019/0354398 | A1* | 11/2019 | Aggarwal ............. G06F 16/183 |
| 2019/0370363 | A1 | 12/2019 | Hersans et al. |

OTHER PUBLICATIONS

Vaishnav P., et al., "Co-pending U.S. Appl. No. 15/282,486," filed Sep. 30, 2016, 40 pages.

* cited by examiner

| PK_NAME | KEY_SEQ | COLUMN_NAME |
|---|---|---|
| PK | 1 | TENANT_ID |
| PK | 2 | JOB_ID |
| PK | 3 | INDEX_NAME |
| PK | 4 | INDEX_VALUE |
| PK | 5 | ENTITY_ID |

Key Sequence: From the most significant (Key 1) to the least significant (Key 5) 302

Fig. 3A

| TENANT_ID | JOB_ID | INDEX_NAME | INDEX_VALUE | ENTITY_ID |
|---|---|---|---|---|
| 00Dxx00000igld | 0PBxx000001aL | 0 | brendugaslatterblum.com | 003x00004YiXi |
| 00Dxx00000igld | 0PBxx000001aL | 0 | infosalesforce.com | 003x00004Tn1z |
| 00Dxx00000igld | 0PBxx000001aL | 0 | infosalesforce.com | 003x00004Tn20 |
| 00Dxx00000igld | 0PBxx000001aL | 0 | infosalesforce.com | 003x00004Tn21 |
| 00Dxx00000igld | 0PBxx000001aL | 0 | infosalesforce.com | 003x00004Tn22 |
| 00Dxx00000igld | 0PBxx000001aL | 0 | infosalesforce.com | 003x00004Tn23 |
| 00Dxx00000igld | 0PBxx000001aL | 1 | bTKSlatterblum.com | 003x00004YiXi |
| 00Dxx00000igld | 0PBxx000001aL | 1 | cATsalsforce.com | 003x00004Tn1z |
| 00Dxx00000igld | 0PBxx000001aL | 1 | eSTMSsalesforce.com | 003x00004Tn20 |
| 00Dxx00000igld | 0PBxx000001aL | 1 | gMNRsalesforce.com | 003x00004Tn21 |
| 00Dxx00000igld | 0PBxx000001aL | 1 | hJNSsalesforce.com | 003x00004Tn22 |
| 00Dxx00000igld | 0PBxx000001aL | 1 | jAMSsalesforce.com | 003x00004Tn23 |
| 00Dxx00000igld | 0PBxx000001aL | 2 | bTKS212686 | 003x00004YiXi |
| 00Dxx00000igld | 0PBxx000001aL | 2 | cAT415555 | 003x00004Tn1z |
| 00Dxx00000igld | 0PBxx000001aL | 2 | eSTMS212555 | 003x00004Tn20 |
| 00Dxx00000igld | 0PBxx000001aL | 2 | gMNR415555 | 003x00004Tn21 |
| 00Dxx00000igld | 0PBxx000001aL | 2 | hJNS212555 | 003x00004Tn22 |
| 00Dxx00000igld | 0PBxx000001aL | 2 | jAMS905555 | 003x00004Tn23 |

4 records are added from the same record based on applying 3 match keys (index names 0, 1, 2) to the same record 350

Fig. 3B

Records 402

| INDEX_NAME | INDEX_VALUE | ENTITY_ID |
|---|---|---|
| 0 | jburksalesforcecom | 003x00004Tnh9 |
| 0 | jsmithsalesforcecom | 003x00004Tnh4 |
| 0 | infosalesforcecom | 003x00004Tngz |
| 1 | jPRKsalesforcecom | 003x00004Tnh9 |
| 1 | jSM0salesforcecom | 003x00004Tnh4 |
| 1 | jSM0salesforcecom | 003x00004Tngz |
| 2 | jPRK415123 | 003x00004Tnh9 |
| 2 | jSM0415123 | 003x00004Tnh4 |
| 2 | jSM0415123 | 003x00004Tngz |
| 4 | jPRKsales | 003x00004Tnh9 |
| 4 | jSM0sales | 003x00004Tnh4 |
| 4 | jSM0sales | 003x00004Tngz |

Fig. 4A

Tracked Statistics 450

| Index Name | Maximum Value |
|---|---|
| 0 | jsmithsalesforcecom |
| 1 | jSM0salesforcecom |
| 2 | jSM0415123 |
| 4 | jSM0sales |

Fig. 4B

```
SELECT INDEX_NAME, INDEX_VALUE, ENTITY_ID FROM INDEX_AND_RECORD_DATA
    WHERE TENANT_ID = '00Dxx000001gId' AND JOB_ID = '0PBxx000001aL' AND (TENANT_ID, JOB_ID,
INDEX_NAME, INDEX_VALUE) > ('00Dxx000001gId', '0PBxx000001aL', '0', 'infosalesforcecom')
LIMIT 20000
```

Fig. 5A

| INDEX_NAME | INDEX_VALUE | ENTITY_ID |
|---|---|---|
| 1 | bTKSlatterblurncom | 003x00004YIXl |
| 1 | cATsalsforcecom | 003x00004Tn1z |
| 1 | eSTMSsalesforcecom | 003x00004Tn20 |
| 1 | gMNRsalesforcecom | 003x00004Tn21 |
| 1 | hJNSsalesforcecom | 003x00004Tn22 |
| 1 | jAMSsalesforcecom | 003x00004Tn23 |
| 2 | bTKS212686 | 003x00004YIXl |
| 2 | cAT415555 | 003x00004Tn1z |
| 2 | eSTMS212555 | 003x00004Tn20 |
| 2 | gMNR415555 | 003x00004Tn21 |
| 2 | hJNS212555 | 003x00004Tn22 |
| 2 | jAMS905555 | 003x00004Tn23 |

Fig. 5B

USING ROW VALUE CONSTRUCTOR (RVC) BASED QUERIES TO GROUP RECORDS OF A DATABASE FOR MULTI-THREAD EXECUTION

CROSS-REFERENCE TO RELATED APPLICATIONS

This application is a continuation of application Ser. No. 15/884,322, filed Jan. 30, 2018, which is hereby incorporated by reference.

TECHNICAL FIELD

One or more implementations relate to the field of database record query; and more specifically, to the usage of row value constructor (RVC) based queries to group records of a database for multi-thread execution.

BACKGROUND ART

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In some implementations of a cloud database (a database that runs on a cloud platform and that is provided as a database service), identifiers are used instead of database keys, and relationships are used instead of foreign keys.

A database may contain thousands or even millions of records. To process so many records efficiently, one may split the database records into more manageable chunks (also referred to as pages). Each of these chunks/pages may be processed by one thread within a multi-thread computing environment. The splitting process may be referred to as pagination. To paginate, one may issue queries to the database (sometimes referred to as paged queries), and each query returns a page from the database records.

One approach is to use offset with limit (also referred to as OFFSET with LIMIT or limit, LIMIT OFFSET) based queries to split a table of records into similarly sized subsets of records. For example, a query may cause the retrieval of 50 records starting from offset 100 by using the offset with limit-based query LIMIT 50 OFFSET 100. A series of offset with limit-based queries that specify the same limit (e.g., 50) and different offsets (e.g., 50, 100, 150, 200, 250, etc.) may split the table into similarly sized subsets of records. The advantage of such queries is that no knowledge of the values in the fields of the records is required, but rather one may generate the series of queries based on just the total number of records and the limit (also referred to as the targeted page number). For example, if 3,000 records are to be split into two pages (e.g., so that each page of records is to be executed by a thread), two offset with limit based queries may be issued: (1) LIMIT 1,500 OFFSET 0; and (2) LIMIT 1,500 OFFSET 1,500. One may specify these two queries without knowing any values in the fields of the records.

Yet the offset with limit-based queries may be computationally inefficient, especially when operating on a relatively large number of records and/or being used to generate a relatively large number of subsets. The offset with limit-based queries must use increasing values for the offsets. Thus, a database management system (DBMS) must read and skip each record from the beginning (record 0) until it reaches the offset value specified in a query. For example, an offset with limit-based query of LIMIT 50 OFFSET 10,000 means that 9,999 records are read and skipped before reaching the starting point of a page for the query. The DBMS needs to keep counting the records, and the operations take memory space and consume computing (e.g., central processing unit (CPU)/graphics processing unit (GPU)) time. For example, when there are one million records to paginate and one of 10 threads to process each page, the last two threads will respectively use queries with the values 800,000 and 900,000 for the offset, means that they will respectively read and skip 799,999 and 899,999 records. Computers may not have enough memory space and/or computing resources to implement such offset with limit-based queries for pagination of a large number of records. Indeed, experiments show that using the offset with limit-based queries to paginate around ten million records may result in a time out. Thus, the offset with limit-based queries is inefficient for pagination of a large number of records.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3A illustrates a primary key according to some implementations.

FIG. 3B illustrates the added records using the primary key of FIG. 3A according to some implementations.

FIG. 4A illustrate a portion of added records according to some implementations.

FIG. 4B illustrates tracked statistic according to some implementations.

FIG. 5A is an example of a RVC based query according to some implementations.

FIG. 5B illustrates the result of applying the RVC based query in FIG. 5A according to some implementations.

DETAILED DESCRIPTION

The following describes implementations for grouping records of a database for multi-thread execution using row value constructor (RVC) based queries. With RVC based queries, a DBMS may go directly to the records that meet the criteria specified in the queries, instead of reading and skipping records as required by offset with limit-based queries. Yet to construct the RVC based queries, value(s) in at least one field of the records need to be specified to paginate the records. Thus, RVC based queries cannot be used when the values in the field(s) of the records are not known or sufficiently predictable to specify the values for the RVC based queries. Implementations address this by tracking, during the generation of the records, statistics regarding values in one or more field(s) of the records, and later using these statistics to the generated RVC based queries for grouping the records of the database. Each of the subsets of records (also referred to as pages) resulting from the grouping (also referred to as paginating) using RVC based queries may be processed by one thread.

Grouping Records of a Database for Multi-Thread Execution Using Row Value Constructor (RVC)

Figure 1:
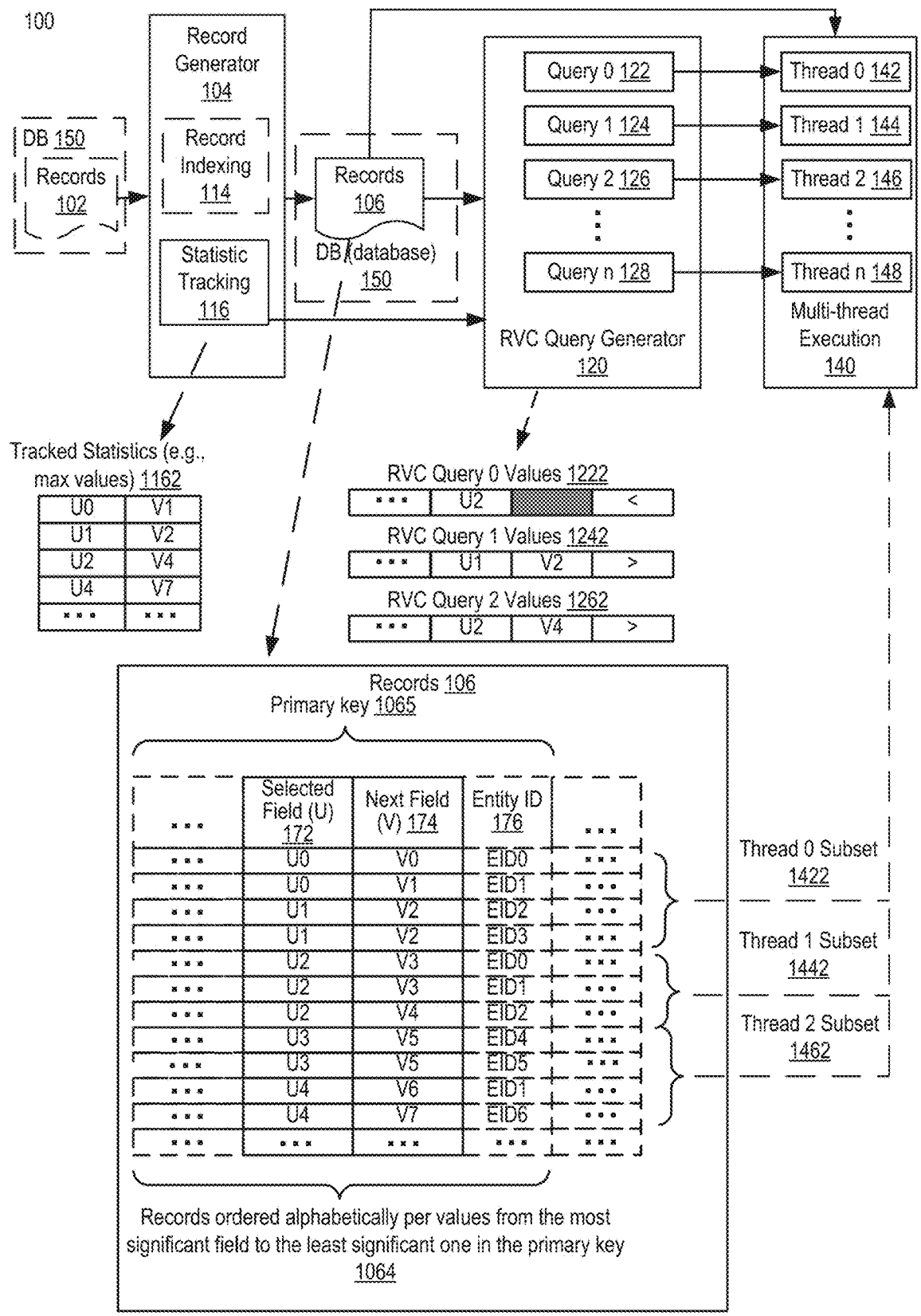
FIG. 1 illustrates grouping records of a database for multi-thread execution using row value constructor (RVC) according to some implementations.

FIG. 1 illustrates grouping records of a database for multi-thread execution using row value constructor (RVC) according to some implementations. System 100 includes a record generator 104, a RVC query generator 120, and multi-thread execution 140, each of which may be implemented as one or more software modules, hardware circuits, or a combination thereof.

The record generator 104 adds records 106 based on a data source. For example, the record generator 104 may generate records 106 based on, for example, records 102. In one implementation, an optional record indexing module 114 within the record generator 104 generates records 106 as a result of indexing records 102. Records 102 and the added records 106 may be stored in a same database 150 or in different databases. In an alternative implementation, records 106 are generated at run-time responsive to a user interacting with a service (e.g., providing commands and data, etc.).

A record within records 106 may belong to a database object, and each record may contain a multiple of fields. While implementations may use one or more types of databases (see above discussion regarding various exemplary database types), a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. In some implementations, the database 150 storing records 106 is a structured query language (SQL) database, and each record within records 106 is stored in a row of an Apache Phoenix table.

A more detailed view of the plurality of fields within records 106 is shown at the lower part of FIG. 1. As shown, each row is a record, and the plurality of records have the same plurality of fields. A sequence of two or more of the plurality of fields form a primary key 1068. A primary key is a sequence of fields within records to identify different ones of the records. A primary key contains one or more values that uniquely identify each record, and the primary key does not contain null values. Other than the fields within the primary key 1068, records 106 may contain one or more additional fields.

The records 106 are ordered according to the values of the primary key 1068 as noted at reference 1069. They are in alphabetic order according to the values in each of the sequence of fields one after the other. In some implementations, for numerical values, a lower value is ordered before a higher value in the alphabetic order. An earlier field in the sequence of fields is more significant than a later field in the sequence of fields. The records are ordered from the most significant field to the least significant field. In records 106, the records are ordered first based on values in the most significant field in the primary key 1068. For any records with the same value in the most significant field, they are then ordered based on values in the second most significant field in the primary key 1068. The process continues until the records are ordered based on the values in the least significant field in the primary key 1068.

For example, two records, A and B, contain primary keys with values of (1, 'Betty', 'xxxx') and (19, 'Alice', 'cccc') within the sequence of fields, respectively. Record A will be ordered earlier than Record B within records 106, because the value '1' is earlier than the value '19' in order and the field for these values is the most significant one within the sequence of fields. The order of Records A and B is so despite that Record A's value for the next field, 'Betty', is later in order than 'Alice', the value for the corresponding field in Record B. If the records A and B contain the same value for the first field, e.g., Records A and B being (1, 'Betty', 'xxxx') and (1, 'Alice', 'cccc') instead, Record B will be ordered earlier because the more significant field has the same value 1, thus the order of the records are determined based on the value in the next field, where 'Alice' is earlier than 'Betty' in alphabetical order.

When adding records 106, a field within the primary key 1068 is selected and it is shown as the selected field 172. For the selected field 172, the illustrated records have exemplary values from U0 to U4. The record generator 104 includes a statistic tracking module 116. For each unique value of the selected field 172, the statistic tracking module 116 may track a statistic based on the values found in the next field of the sequence of fields, shown as the next field 174. The illustrated records have exemplary values for the next field 174 from V0 to V7. The next field 174 is not the last field of the primary key 1068 in some implementations. For example, a field following the next field 174 may be an entity identifier (ID) field 176 (also referred to as a record ID) to identify a record, where each of records 106 has a unique value in its entity identifier field that identifies a corresponding item in the data source from which that record is based. For example, where each of records 106 is based on a corresponding one of records 102 (such as when records 106 is generated by indexing records 102), both these corresponding records may store the same value in their respective entity ID fields and the other values in the fields of that record 106 may be based on the values in the corresponding one of records 102. Thus, for a given one of the records 106, the value of the entity ID field 176 may be used to identify a corresponding one of the records 102 from which the given one of the records 106 is based. As illustrated, the exemplary values in the entity ID field are from EID0 to EID6. Multiple records may share the same unique value for the selected field 172, while they have multiple different values for the next field 174.

The statistic tracking module 116 tracks the statistics based on the values for the next field 174 as records 106 are added. For example, the statistics may be the maximum values for the next field 174 for each unique value for the selected field 172 as tracked at reference 1162. Since records 106 are ordered alphabetically, for each unique value for the selected field 172, the last record with the unique value for the selected field 172 has the maximum value for the next field 174. Thus, for the illustrated records 106, the tracked statistics 1162 for the maximum values are the following: V1 for U0, V2 for U1, V4 for U2, and V7 for U4. The tracked statistics 1162 may be stored in a cache, a register, or another machine-readable medium within a storage device of a computing system (e.g., a multi-tenant cloud computing architecture supporting multiple services). Additionally or alternatively, the tracked statistics may be values other than the maximum values, e.g., minimum values or median values. Thus, the tracked statistics are based on or are values within the next field 174 (e.g., for each of the unique values in the selected field 172, the value(s) for the tracked statistics may be the maximum value, the minimum value, the median value, and/or other values that are based on the values within the next fields 174 of the records having the that unique value in the selected field 172.

As records 106 are added (e.g., to the database 150), the stored values within the tracked statistics 1162 may be updated based on the values in the selected field 172 and the next field 174 of the newly added records. For a unique value for the selected field 172, a newly added record may include a value for the next field 174 that is better than the stored value for meeting the criteria of the statistic. For example, for the unique value of U0, assume that the currently stored maximum value is 'Betty', and assume that a new record being added has the same value U0 for the selected field 172 and the value 'Cathy' for the next field 174. Since 'Cathy' is later than 'Betty' in alphabetical order, the value for the statistic (the maximum value) in the tracked statistics 1162 is updated to 'Cathy' from 'Betty' for the value U0.

In some embodiments, a plurality of records may be added concurrently by multiple threads, and two or more threads may generate records with the same value for the selected field 172. Each thread may identify its value for the tracked statistic, and the identified values are then compared to the stored value for the tracked statistic, and the stored value may be updated based on the comparison. The value that meets the criteria for the tracked statistic (e.g., the maximum value, the minimum value, or the median value) is stored.

The tracked statistics 1162 are then provided to the RVC query generator 120 to generate a plurality of RVC based queries. Each RVC based query includes a RVC. A RVC is an ordered sequence of elements, which may be delimited by parenthesis. In a RVC, the further left an element is, the more significant the element is, and the comparison of the more significant element in control unless the values for that element are identical. If the values for that element are identical, the immediate next element to the right of that element controls. For example, assuming (1, 'Betty', 'xxxx') and (19, 'Alice', 'cccc') are used in two RVCs, (1, 'Betty', 'xxxx') is smaller than (19, 'Alice', 'cccc') (i.e., (1, 'Betty', 'xxxx')<(19, 'Alice', 'cccc')) because for the most significant element (the furthest left one), the value of the former, '1" is less than that of the latter, '19', and it does not matter that, for the immediate next element to the right (a less significant element), the value of the former is larger than that of the latter ('Betty'>'Alice'). Note, however, when the values for the more significant element are the same, the values for the immediately next element control, thus (1, 'Betty', 'xxxx')>(1, 'Alice', 'cccc').

Elements in a RVC may be compared in the sequence as ordered from the most significant one to the least significant one. Note that records 106 contain values for the sequence of fields within the primary key 1068, and records 106 are ordered based on the values in the sequence of fields, from the most significant field to the least significant field. Thus, a RVC based query, using a comparison logical operator, may select a subset of records 106 for further processing. The logical operators may include larger than (>), smaller than (<), equal (=), or others. A series of RVC based queries that use the tracked statistics 1162, may split records 106 into subsets of roughly equal number of records.

The RVC query generator 120 may generate a plurality of queries. The plurality of queries includes n+1 queries, which are represented by Query 0 at reference 122, Query 1 at reference 124, Query 2 at reference 126, and Query n at reference 128. The multi-thread execution 140 may then use the provided plurality of queries, where each thread may execute one of the provided plurality of queries to select a subset of records 106. Thus, the threads of the multi-thread execution 140 split records 106.

For example, for the illustrated portion of records 106 (10 records), the multi-thread execution 140 may allocate three threads, each processing one of three subsets of the illustrated portion of records 162. In this example, thread 0 at reference 142, thread 1 at reference 144, and thread 2 at reference 146 will submit query 0 at reference 122, Query 1 at reference 124, and Query 2 at reference 126, respectively.

The initial query, Query 0, may be used to select the first of the three subsets. The initial query may select records with values for the selected field 172 being U0 and U1. Since records 106 are ordered alphabetically from the most significant field to the least significant field, the initial Query 0 may select the first subset by specifying the value for the selected field 172 to be less than U2. Query 0 can be the following:

---

SELECT SELECTED_FIELD, NEXT_FIELD, ENTITY_ID FROM RECORDS 106
    WHERE SELECTED_FIELD < 'U2'

---

The unique value for the selected field 172 ('U2') and logical operation ('<') for Query 0 are illustrated at reference 1222. Query 0 assumes that no fields are more significant than the selected field 172 in the primary key 1068, and only values in the selected field 172, next field 174, and entity ID field 176 are needed for the processing by the thread 0 at reference 142. Thus, the values in the selected field 172, next field 174, and entity ID field 176 are selected from records 106 ("SELECT SELECTED_FIELD, NEXT_FIELD, ENTITY_ID FROM RECORDS 106"), where FROM indicates that the subset will be selected from records 106. When more fields are in the primary key 1068, these fields may be added to the selection, as the example in FIG. 5A shows. The initial query selects from records 106 all the records whose values for the selected field 172 are less than U2 ("WHERE SELECTED_FIELD<'U2'"). Since for the selected field 172, the only values less than U2 are U0 and U1, the first subset of records 106 with values for the selected field 172 being U0 and U1 are selected, and they are the following: (U0, V0, EID0), (U0, V1, EID1), (U1, V2, EID2), and (U1, V2, EID3). Thus, thread 0 selects and executes the first subset of the illustrated portion of records 106 as illustrated at reference 1422.

Note that the initial query, Query 0, does not use the tracked statistic, and the value for the selected field 172 and logical operation are sufficient to select the first subset. In other words, an initial query may include a RVC with a logical operation (e.g., '<'), a specific one (e.g., 'U2') of the unique values found within the selected one of a sequence of fields without a respective tracked statistic for the next one of the sequence of fields in some implementations. For selecting the first subset, the initial query may also take the following form:

SELECT SELECTED_FIELD, NEXT_FIELD, ENTITY_ID FROM RECORDS 106
    WHERE (SELECTED_FIELD, NEXT_FIELD) > ('0', '0')

This query selects the records as long as the value for the next field is higher than zero. For a text string in the next field, zero may be defined as the initial value, thus this query starts from the first record with the value for the next field being non-zero, which is the first record for records 106.

The next query, Query 1, may be used to select the second of the three subsets, and it may select records with values for the selected field 172 being U2. Query 1 can be the following:

SELECT SELECTED_FIELD, NEXT_FIELD, ENTITY_ID FROM RECORDS 106
    WHERE (SELECTED_FIELD, NEXT_FIELD) > ('U1', 'V2')

The unique values ('U1' and 'V2') and logical operation ('>') for Query 1 are illustrated at reference 1242. Different from Query 0, Query 1 specifies not only the value for the selected field 172 ('U1') but also the tracked statistic value ('V2') for the next field 174 corresponding to the value of the selected field, U1, obtained from the tracked statistics 1162. The selection excludes records that have been selected by the initial Query 0. Query 1 selects the following from records 106: (U2, V3, EID0), (U2, V3, EID1), (U2, V4, EID2), (U3, V5, EID4), (U3, V5, EID5), (U4, V6, EID1), and (U4, V7, EID6).

Note that including both U1 and V2 to select the second subset (i.e., WHERE (SELECTED_FIELD, NEXT_FIELD)>'V2')) is computationally more efficient than using only U1 (i.e., WHERE SELECTED_FIELD>U1) from the illustrated portion of records 106. While some implementations use RVC based queries (for queries other than Query 0) that include the unique values in the selected one (e.g., the selected field 172) of the sequence of fields (e.g., fields in the primary key 1068) and the next one (e.g., the next field 174) of the sequence of fields to improve efficiency, alternative implementations use RVC based queries (for queries other than query 0) that include the selected one (e.g., the selected field 172) of the sequence of fields (e.g., fields in the primary key 1068) and not the next one (e.g., the next field 174) of the sequence of fields.

The query following Query 1 is Query 2, and it may be used to select the last subset of the three subsets, and it may select records with values for the selected field 172 being U3 and U4. Query 2 can be the following:

SELECT SELECTED_FIELD, NEXT_FIELD, ENTITY_ID FROM RECORDS 106
    WHERE (SELECTED_FIELD, NEXT_FIELD) > ('U2', 'V4')

The values ('U2' and 'V4') and logical operation ('>') for Query 2 are illustrated at reference 1262. Query 2 is similar to Query 1, and Query 2 specifies the value for the selected field 172 ('U2') and also the tracked statistic value ('V4') for the next field 174 corresponding to the value of the selected field, U2, obtained from the tracked statistics 1162. Query 2 selects the following from records 106: (U3, V5, EID4), (U3, V5, EID5), (U4, V6, EID1), and (U4, V7, EID6).

Note that Query 1 and Query 2 are different from Query 0. Query 1 and Query 2 each identify the first one of the records in the alphabetic order whose values for those fields meet the logical operation. For example, Query 1 identifies the first one being the one including (U2, V3, EID0) and Query 2 identifies the first one being the one including (U3, V5, EID4). Query 1 and Query 2 each include an RVC with a logical operation ('>' in both cases), a specific one of the unique values ('U1' and 'U2' respectively) found within the selected one of the sequence of fields, and, for that specific value, the tracked statistic ('V2' and 'V4' respectively) for the next one of the sequence of fields. On the other hand, the initial query, Query 0, identifies the last one of the records whose values for the selected field meets the logical operation ('<'). Additionally, Query 0 does not include a respective tracked statistic for the next field.

While Query 1 and Query 2 each identify the first one of the records of the respective subset, none of them identifies the last one for the subset. Indeed, the records selected by Query 1 is a superset of the ones selected by Query 2 in this example. Several ways may be used to avoid or reduce the occurrences of the same record being processed by two or more threads executing different queries.

For example, in some implementations, when a record is processed by a thread, a flag is set to indicate that the record has been processed. A thread can test the flag for the next records it is to process, and if set to indicate that the record was already processed (by another thread), the thread determines it is finished processing its subset of the records. In a database with thousands or even millions of records, threads of the multiple threads often start their respective queries around the same time, and each (sometimes the initial query is the exception) identifies their respective first one of the records to process. The respective first ones are selected to be far enough apart in the database such that a thread processing a given subset will process and flag its first record before a thread processing an immediately preceding subset will reach that first record. For example, threads 1 and 2 submit Queries 1 and 2, and Thread 2, using Query 2, processes (U3, V5, EID4) as its first record. Thread 1, using Query 1, will reach that record later (as the fourth record in this simplified example). By the time thread 1 reaches that record, it finds that the flag has been set based on execution of thread 2, and thread 1 knows it has reached the end of its subset (since the records are ordered alphabetically, if one record is processed by another thread, the following records (which are the records higher in alphabetical order) must have been allocated to a different thread). Thus, using Query 1 and Query 2 and a flag indicating execution status, thread 1 and thread 2 may select continuous, yet non-overlapping records for processing.

Alternatively or additionally, one or more queries may each add a limit for the records to be selected, so that these queries stop when their respective limits are reached (and thus forgo use of the previously discussed flags). For example, a modified query, Query 1' may include the following:

```
SELECT SELECTED_FIELD, NEXT_FIELD, ENTITY_ID FROM
RECORDS 106
    WHERE (SELECTED_FIELD, NEXT_FIELD) > ('U1', 'V2')
    LIMIT 10.
```

Query 1' will select no more than ten records that satisfy the condition of "WHERE (SELECTED_FIELD, NEXT_FIELD)>('U1', 'V2')," thus LIMIT 10 sets a hard limit on how many records the RVC based query will select. The limit may be intentionally larger than the expected size of a subset, so that some records may be selected by multiple queries. The advantage of the overlap of some queries is that records won't be missed by these queries. While overlapping may take extra computing resources, it is preferable to missing some records completely. In the illustrated example, while the expected size of the subsets is around 4, the offset limit is set to 10. The RVC based query, Query 1', incorporates features in the offset with limit-based query, and can be efficient in some implementations.

Alternatively or additionally, one or more queries may add more logical operations to identify both the starting and ending points of a subset (and thus forgo use of the previously discussed flags). For example, a modified query, Query 1", may include the following:

```
SELECT SELECTED_FIELD, NEXT _FIELD, ENTITY_ID FROM
RECORDS 106
    WHERE (SELECTED_FIELD, NEXT_FIELD) > ('U1', 'V2')
    AND SELECTED_FIELD < 'U3'
```

Query 1" will select only the records with values for the selected field being U2. While seven records satisfy the selection criteria of Query 1 (i.e., (U2, V3, EID0), (U2, V3, EID1), (U2, V4, EID2), (U3, V5, EID4), (U3, V5, EID5), (U4, V6, EID1), and (U4, V7, EID6)), only three satisfy the selection criteria of Query 1" (i.e., (U2, V3, EID0), (U2, V3, EID1), and (U2, V4, EID2)). While Query 1" has the advantage of limiting the starting and ending points of the subset, it may take significantly more computational resources. First, Query 1" includes one additional comparison. Additionally, the second logical operation in Query 1" specifies only a value for the selected field without specifying a value for the next field. As discussed above, when the values for both the selected field and the next field are specified in a query, the thread running the query does not need to determine the value for the next field, and thus the thread runs faster. Yet if the second logical operation in Query 1" specifies the value for the next field, a different statistic for the value in the next field may need to be tracked. In this example, the minimum value in the next field corresponding to the selected field U3 would be tracked. The ending point of the subset may be selected by requiring the following: (SELECTED_FIELD, NEXT_FIELD)<('U3', 'V5'). Note that V5 is the minimum value for the unique value U3. Tracking additional statistics may not be desirable in some implementations.

Using one or more of the approaches discussed above, the illustrated 10 records within records 106 may be split by three threads, where thread 0 selects the first subset (illustrated as thread 0 subset 1422), thread 1 selects the second subset (illustrated as thread 1 subset 1442), and thread 2 selects the third subset (illustrated as thread 2 record subset 1462). Note that the sizes of the subsets are not identical, and a roughly equal size is sufficient for many implementations.

Using the tracked statistics 1162 maintained while records 106 are added, a plurality of RVC based queries may be generated. These queries may be provided to different ones of a plurality of threads, with each thread submitting its provided query and processing a subset of records 106 based on execution of that query. Each of the subsets includes records that are consecutive according to the alphabetic order starting from the initial record for that subset. The tracked statistics 1162 makes the RVC based queries feasible in paginating the records as it provides the values in the field(s) of the records needed for the queries to delimit the subsets. By specifying the values in the field(s) of the records for the RVC based queries, implementations are more efficient (e.g., in term of consuming computing resources, memory, etc.) than approaches that use offset with limit based queries when the number of records is large.

The multi-thread execution 140 that uses the RVC based queries may split records as part of providing a variety of services/applications relative to a multi-tenant database system. For example, multi-thread execution 140 may be used for: 1) deduplicating records within the multi-tenant database system; and/or 2) filtering/revising/adding records within the multi-tenant database system.

Figure 2:
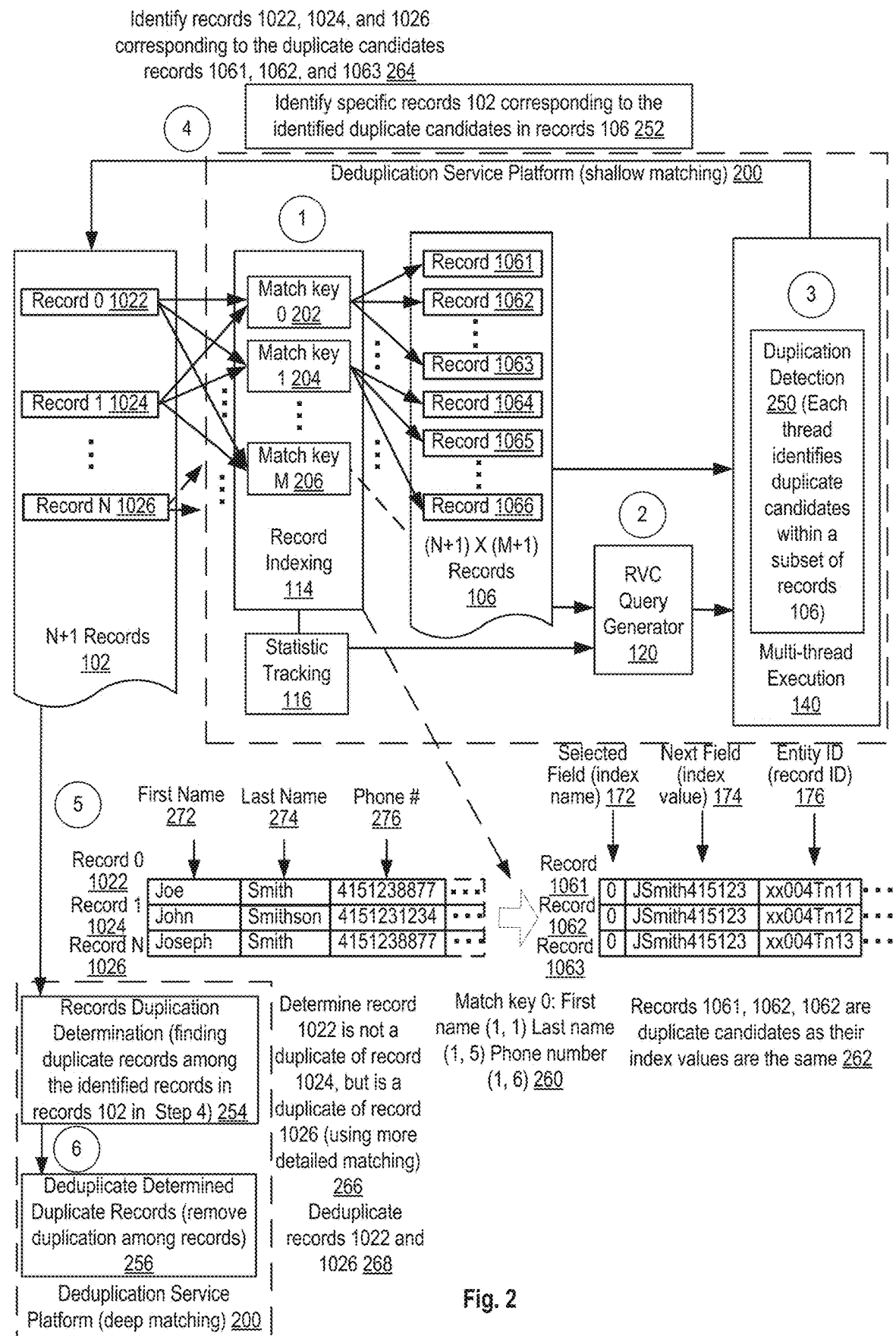
FIG. 2 illustrate record grouping using row value constructor (RVC) in a deduplication service platform according to some implementations.

Record Grouping Using Row Value Constructor (RVC) in a Deduplication Service Platform FIG. 2 illustrates record grouping using row value constructor (RVC) based queries in a deduplication service platform according to some implementations. A database may contain duplicate records, and the deduplication service platform removes the duplication within the records. For example, a deduplication service platform may merge two or more records into one, which includes values obtained from both records; the deduplication service platform may simply delete one of the two records. The RVC based queries discussed above may be used as part of a deduplication service platform 200 to identify records that may be duplicates (referred to as duplicate candidates). The circles within FIG. 2 illustrate the order in which operations may be performed for deduplication according to some implementations.

Records 102 may be processed by the deduplication service platform 200. Records 102 have N+1 records including record 0 at reference 1022, record 1 at reference 1024, and record N at reference 1026. These records are indexed at Circle 1 to generate records within records 106. The indexing by record indexing 114 includes matching records to one or more match keys. The illustrated example has M+1 match keys, which include match key 0 at reference 202, match key 1 at reference 204, and match key M at reference 206. Since each match generates a record, the record indexing generates (N+1)×(M+1) records, illustrated as records 1061 to 1066. Note that because each match key results in a corresponding an added record 106 for each of records 102, applying multiple match keys to each of the records 102 inherently results in multiple corresponding records 106 for that record 102, where the existence of the same value in the entity ID field of these multiple corresponding records 106 indicates these records were added by applying different match keys to the same record 102. See an example in FIG. 3B.

A match key may be based on one or more fields of records 102. For example, a match key may be based on company name field and a zip code field in records 102. A match key may be in the form of "Field_name (number of token(s), number of character(s) from each token)", where the first number inside the brackets refers to the number of tokens to copy from a field and the second number refers to the number of characters from the most significant character to copy from each token. For example, assume a record has in the company field 'Orange Sporting Company' and in the zip code field '94105'. If the match key is "company (2, 6) zip (1, 3)", the match result from the record after applying the match key is 'OrangeSporti941'. The match result becomes a value of a record 106. Each match key may be assigned a value, e.g., the match key "company (2, 6) zip (1, 3)" may be given a numerical value, say 29. The numerical value representing the match key may be referred to as an index name (or simply name), and the match result from applying the match key may be referred to as an index value. Those of the records 106 generated based on a given match key will include less than all of the fields and/or the less than the entire values in those fields of the records 102 that must be compared when identifying duplicate records. As such, comparisons on the records 106 generated based on a given match key are considered "shallow" in that they identify candidates which must be confirmed to be duplicates based on a "deep" comparisons on the records 106 (described in more detail below). Also, multiple different match keys may be used as illustrated to identify more candidate duplicates.

The process of applying a match key to records 102 is illustrated in more details at the lower right portion of FIG. 2. A match key 0 is applied to records 102, including record 0 at reference 1022, record 1 at reference 1024, and record N at reference 1026. These records have a number of fields, including a first name field 272, a last name field 274, and a phone number field 276. The values for these fields are listed as ('Joe', 'Smith', '4151238877'), ('John', 'Smithson', '4151231234'), and ('Joseph', 'Smith', '4151238877'), respectively. The match key 0 is "First name (1, 1) Last name (1, 5) Phone number (1, 6)" as illustrated at reference 260. Applying the match key 0 to the records 0, 1, and N, results in the same value of 'JSmith415123' to be added to records 1061, 1062, and 1063. The match key 0 is given a numerical value, 0, which is the index name for the match key 0. The match result 'JSmith415123' is the index value for the index 0. Each of records 1061, 1062, and 1063 was generated as part of the record indexing 114, was based on the values from a different corresponding one of the records 102, and has in its record identity (ID) field the record ID of that corresponding one of the records 102.

A portion of values within records 1061, 1062, and 1063, from applying match key 0, are shown. Note that these fields can be used in the RVC based queries discussed herein above, where the index name field is the selected field 172, the index value field is the next field 174, and the record ID field is the entity ID field 176. That is, the tracked statistics discussed herein above is the statistic for the match results from applying match keys in the deduplication application. The added records 1061, 1061, and 1063, included in records 106, are ordered alphabetically from the most significant field to the least significant field in a primary key, which includes the selected field 172, the next field 174, and the entity ID field 176. The statistics for the next field 174 are tracked when records 106 are added, and the RVC query generator 120 generates a plurality of RVC based queries for the multi-thread execution 140 to provide to different threads as discussed herein above.

In the deduplication service platform 200, each thread identifies duplicate candidate(s) within its subset of records 106 at reference 250, as illustrated at Circle 3. The identification includes checking the next field values for the same selected field value. The same selected field value of two records indicates that the two records are added as the result of applying the same match key; and for the same match key, the match results in the two records can be compared to determine if those of the records 102 to which they correspond may be duplicates of each other. For some match keys, the records 106 are considered as duplicate candidates when the next field values, which are the match results, are identical. The duplication determination based on matching results being identical is sometimes referred to as exact matching. For records 1061, 1062, and 1063, the match results in the next field 1174 are the same 'JSmith415123', thus, these records are considered duplicate candidates as illustrated at reference 262. For some match keys, the records are considered duplicate candidates when the match results are close enough (e.g., the number of same characters for the next field in these records reaches a thread value), and the matching is sometimes referred to as fuzzy matching.

Each thread identifies duplicate candidates within its subset of record 106, and the since this identification of duplicate candidates is done using the added record 106 which were generated from match keys, it may be referred to as "shallow matching." The matching is shallow in the sense that it does not exhaustively compare values of all the fields of existing records (e.g., records 102); rather, it compares full or partial values of one or more fields of the existing records, which are added as new records (e.g., records 106). The comparison is much quicker as few values in each record (often only one value, which is the value for the next field) are used to perform the comparison. For example, to compare record 0, record 1, and record N, even if only values for the three illustrated fields in each record are compared, a thread has to compare (1) 'Joe', 'John', 'Joseph' in the first name field 272, (2) 'Smith', 'Smithson', and 'Smith' in the last name field 274, and (3) '4151238877', '4151231234', and '4151238877' in the phone number field 276. It would consume significantly more computing resources to compare thousands or even millions of records, each with multiple fields (e.g., tens of fields). Using the shallow matching, the deduplication service platform 200 generates records 1061, 1062, 1063, each of which includes an index value (the value for the next field) that contains partial values of each of the three fields in the respective records 102. The comparison of the index values identifies duplicate candidates without performing the exhaustive comparison among the existing records.

Once the duplicate candidates in records 106 are identified, the process goes to Circle 4, and the deduplication service platform 200 identifies the specific records within records 102 corresponding to the identified duplicate candidates in records 106 at reference 252 (e.g., using the values in the entity ID field 176). In our example, records 1061, 1062, and 1063 are duplicate candidates to each other, and thus the deduplication service platform 200 will identify, at reference 264, the corresponding specific records in records 102, which are records 1022, 1024, and 1026 as duplicate candidate records in records 102.

Then at Circle 5, the deduplication service platform 200 determines whether the duplicate candidates in records 102 are indeed duplicates. The determination at reference 254 includes a more exhaustive comparison among the duplicate candidates in records 102 corresponding to the identified duplicate candidates in records 106. The more exhaustive comparison includes comparing the full values of at least some of the fields of the duplicate candidates within the records 102, such as the fields used for indexing and/or other fields. In this example, by a more exhaustive comparison, the deduplication service platform 200 determines that records 1022 and 1024 are not duplicates because the full values for all fields are different: 'Joe' vs. 'John', 'Smith' vs. 'Smithson', '4151238877' vs. '4151231234'. In contrast, the deduplication service platform 200 determines that records 1022 and 1026 are duplicates because the full values for two fields, last name and phone number, are the same. While values for the first name field are different, the value of 'Joe' vs. 'Joseph' are determined to be close enough using a fuzzy matching (e.g., two leading characters within the values are the same).

The more exhaustive matching at reference 254 may be referred to as "deep matching." The deep matching is applied only to the records 102 that are identified through the "shallow matching" of the corresponding records 106. Thus, the deep matching is performed on fewer of the records 102 than the shallowing matching on the records 106.

After the deep matching is performed on the duplicate candidates in records 102 to determine which are in fact duplicate records, the process continues to Circle 6, where the deduplication service platform 200 merges the determined duplicate records at reference 256. In this example, records 1022 and 1026 are determined to be duplicates of each other, and records 1022 and 1026 are then deduplicated at reference 268. The deduplication may include one of the following: (1) deleting record 1022, (2) deleting record 1022 and incorporating information from record 1022 into record 1026, (3) deleting record 1026, or (4) deleting record 1026 and incorporating information from record 1026 into record 1022. The incorporation of information includes adding information from the deleted record to the remaining record. For example, if record 1022 is deleted, a new note may be added to record 1026 indicating that the nick name for Mr. Smith is 'Joe', which is the information obtained from the deleted record 1022.

Using the RVC based queries, the deduplication service platform 200 may split the added records 106 into multiple subsets, each subset being processed by a thread of the multi-thread execution 140. Each thread may then preform shallow matching in its subset to identify duplicate candidates. The deduplication service platform 200 may then use the identified duplicate candidates within the records 106 to identify those of the records 102 to which they correspond as identified duplicated candidates, perform deep matching on the identified duplicate candidates in records 102 to identify which are in fact duplicate records, and remove the duplication, thus completing the deduplication process. While in some implementations the software module(s), hardware circuit(s), or combination thereof used for the shallow matching may be separate from those used for the deep matching, in others they may be integrated.

EXAMPLES

FIGS. 3A-B provides an example of adding records based on a primary key according to some implementation. FIG. 3A illustrates a primary key according to some implementations. The primary key has five fields: tenant ID (TENANT_ID), job ID (JOB_ID), index name (INDEX_NAME), index value (INDEX_VALUE), and entity ID (ENTITY_ID). These fields are ordered in the sequence from the most significant key field to the least significant key field as illustrated at reference 302. The additional fields, the tenant ID and the job ID, are often needed for pagination in a multi-tenant database system to specify a tenant, and specify a job for the specified tenant. More or less fields may be used for a primary key in different implementations.

FIG. 3B illustrates the added records using the primary key of FIG. 3A according to some implementations. Each of the added records have values for the five fields. Because the added records are ordered alphabetically from the most significant field to the least significant field, when thousands or even millions of records are processed, the most significant one or more fields will have the same values for many records. In the snapshot shown in FIG. 3B, the tenant ID and the job ID all have the same values: '00Dxx0000001gId' and '0PBxx0000001aL', respectively. The field following the two fields is "index name," which is referred to as simply name in some implementations. The values for the index name indicate respective match keys applied. In this example, three match keys, named 0, 1, and 2 are applied to add these records. The field following "index name" is "index value," followed by entity ID fields. Note that a number of records have the same entity ID. For example, reference 350 identifies the three records having the same entity ID '003xx00004YIXI'. These three records are added from applying three match keys (match keys 0, 1, 2) to the same record.

FIG. 4A-B illustrate statistic tracking according to some implementations. FIG. 4A illustrates a portion of added records according to some implementations. The portion of records is illustrated as records 402. The more significant fields of a corresponding primary key, such as the tenant ID and the job ID illustrated in FIG. 3B, are ignored here as they are assumed to return the same values. Similar to FIG. 3B, records in FIG. 4A are ordered alphabetically from the more significant field to the less significant one.

FIG. 4B illustrates tracked statistics according to some implementations. The tracked statistics 450 tracks a statistic of the index value for each unique index name of records 402. In this example, the tracked statistic is the maximum value. For the unique index name 0, the maximum value for the index value is 'jsmithsalesforcecom'. Similarly, for the unique index names 1, 2, and 4, the maximum values for the respective index values are 'jSM0salesforcecom', 'jSM00415123', and 'jSM0sales', respectively.

FIGS. 5A-B provide an example of a RVC based query used to split records according to some implementations. FIG. 5A is an example of a RVC based query according to some implementations. The query selects three fields, index name, index value, and entity ID from records as shown as the following: SELECT INDEX_NAME, INDEX_VALUE, ENTITY_ID. The selection is performed on records in a database object, which is named as INDEX_AND_RECORD_DATA, and expressed in the query as the following: FROM INDEX_AND_RECORD_DATA. The selection is performed when the following conditions are met: (1) tenant ID is '00Dxx0000001gId', (2) job ID is '0PBxx0000001aL', (3) a RVC comparison results in true: (tenant ID, job ID, index name, index value)>'00Dxx0000001gId', '0PBxx0000001aL', '0', 'info-salesforcecom'), and (4) the selection is limited to reading 20,000 records. In the exemplary code, these conditions are expressed as the following:

Where TENANT_ID = '00Dxx0000001gId' AND JOB_ID = '0PBxx0000001aL' AND
(TENANT_ID, JOB_ID, INDEX_NAME, INDEX_VALUE) > ('00Dxx0000001gId', '0PBxx0000001aL', '0', 'infosalesforcecom')
    LIMIT 20000

An example subset of records retrieved through execution of this query are illustrated in FIG. 5B in one implementation. Since the condition includes that INDEX_NAME (the selected field)>'0', the selected records are the ones with (index) names being 1 and 2. Additionally, the corresponding statistic for the index value (the next field) identifies the first record for the subset, which is the first one with the value of NAME=1, and it is ('1', 'bTKSlaterblumcom', '003xx00004YIXI').

Operation of Some Implementations

The operations in the flow diagram of FIG. 6 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagram.

Figure 6:
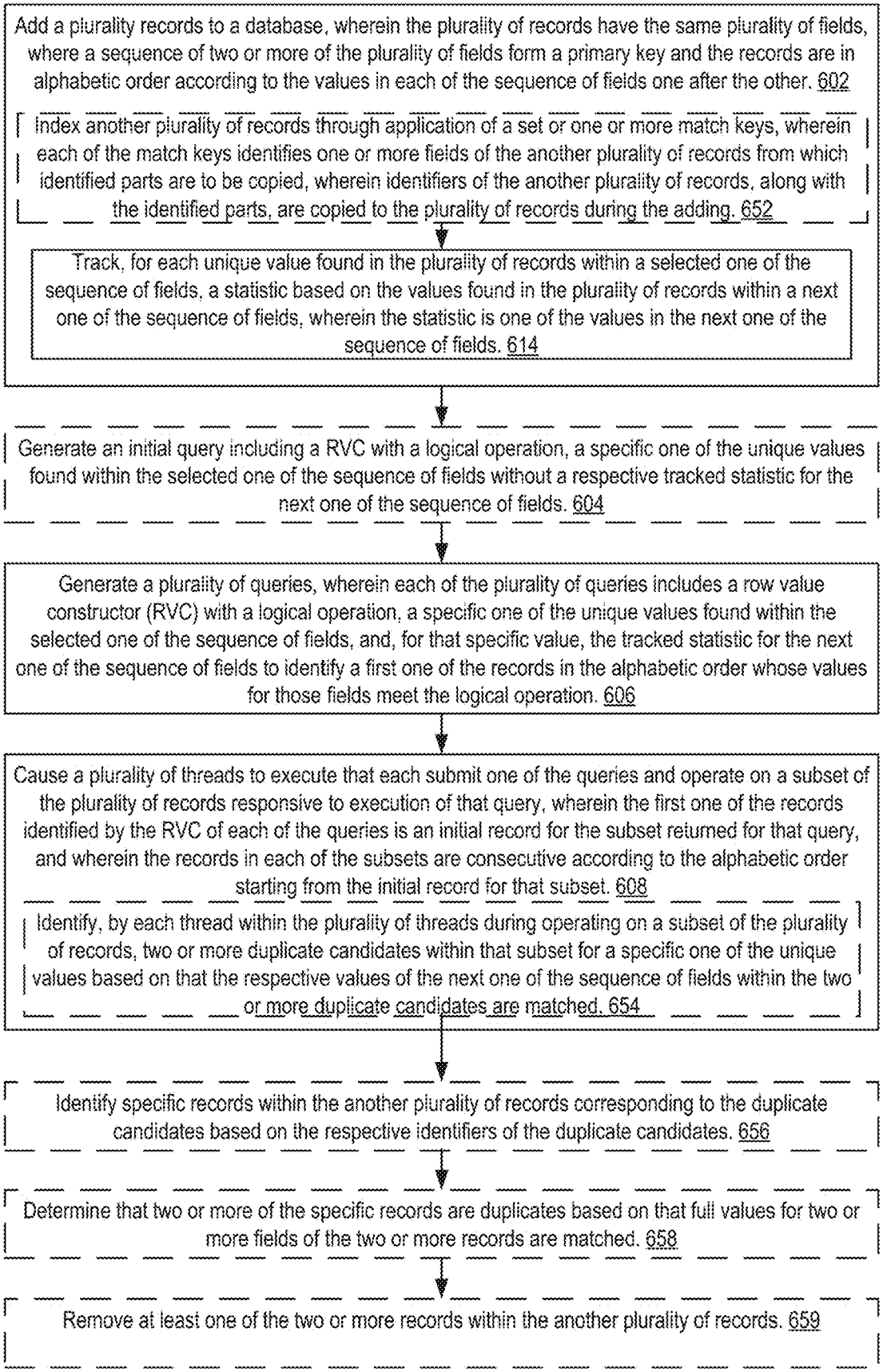
FIG. 6 is a flow diagram illustrating the operations relating to using row value constructor (RVC) based queries to group records of a database for multi-thread execution according to some implementations.

FIG. 6 is a flow diagram illustrating the operations relating to using row value constructor (RVC) based queries to group records of a database for multi-thread execution according to some implementations. The alternative implementations discussed previously also apply to this flow diagram. Method 600 may be performed using the record generator 104, the RVC query generator 120, multi-thread execution 140, and/or other software modules/hardware circuits for the deduplication service platform 200.

At reference 602, a plurality of records are added to a database. Records 106 and database 150 are examples of the plurality of records and the database, respectively. The plurality of records have the same plurality of fields, wherein a sequence of two or more of the plurality of fields form a primary key (e.g., the primary key 1068) and the records are in alphabetic order according to the values in each of the sequence of fields one after the other. The records are ordered alphabetically from the most significant field to the least significant one. See FIG. 3B for an example. In some implementations, the sequence of fields includes one or more fields that are earlier in the sequence of fields than the selected one of the sequence of fields. FIG. 3A provides an example, where three more fields are earlier in the sequence of fields than the selected field, which is index name.

In some implementations, during adding of the plurality of records to the database, indexing another plurality of records are performed at reference 652, which includes indexing the another plurality of records through application of a set or one or more match keys. Each of the match keys identifies one or more fields of the another plurality of records from which identified parts are to be copied, wherein identifiers of each of the another plurality of records, along with the identified parts, are copied to respective records within the plurality of records during the adding. In some implementations, each of the another plurality of records includes an identifier, and wherein the adding includes, for each of the another plurality of records and for each of the set of match keys, and adding one record to the plurality of records that includes the parts identified by that match key from that one of the another plurality of records and the identifier from that one of the another plurality of records. Records 102, the match key 0 at reference 260, and entity IDs in the entity ID field 176 are examples of the another plurality of records, the match key, and the corresponding identifiers, respectively. FIG. 2 illustrates an example of adding records (see records 106) from the another plurality of records (records 102) through indexing. The indexing of the another plurality of records is an operation to deduplicate the another plurality of records in some implementations, as illustrated in FIG. 2.

The adding at reference 602 includes tracking, for each unique value found in the plurality of records within a selected one of the sequence of fields, a statistic based on the values found in the plurality of records within a next one of the sequence of fields, where the statistic is one of the values in the next one of the sequence of fields. The selected field 172 and the next field 174 are examples of the selected one of the sequence of fields and the next one of the sequence of fields, respectively. The tracked statistic(s) may be one or more of the maximum value, the minimum value, and the median value for the next one of the sequence of fields as discussed herein above relating to the statistic tracking module 116.

In some implementations, the statistic, for each unique value found in the plurality of records within a selected one of the sequence of fields, is a maximum value found in the plurality of records within the next one of the sequence of fields. The tracked maximum value is also discussed herein above relating to the statistic tracking module 116.

Optionally at reference 604, an initial query is generated. The initial query includes a RVC with a logical operation and a specific one of the unique values found within the selected one of the sequence of fields, but not a respective tracked statistic for the next one of the sequence of fields. Query 0 in FIG. 1 is an example of the initial query. As illustrated at reference 1222, the values of Query 0 do not include the respective tracked statistic for the next one of the sequence of fields, the next field 174.

At reference 606, a plurality of queries are generated. Each of the plurality of queries includes a row value constructor (RVC) with a logical operation, a specific one of the unique values found within the selected one of the sequence of fields, and, for that specific value, the tracked statistic for the next one of the sequence of fields to identify a first one of the records in the alphabetic order whose values for those fields meet the logical operation. Query 1 at reference 124, Query 2 at reference 126, and the query in FIG. 5A are examples of the plurality of queries. In some implementations, each of the RVCs include values for all but one of the fields in the sequence of fields: For example, the values for entity ID field 176 are not included in the RVCs.

In some implementations, the RVC of each of the queries includes a value for each of the one or more fields that are earlier in the sequence of fields. FIG. 5A provides an example, where the fields of tenant ID and job ID are earlier in the sequence of fields within the primary key, and their values are included in the illustrated RVC based query.

At reference 608, a plurality of threads are caused to execute that each submit one of the queries and operate on a subset of the plurality of records, where the first one of the records identified by the RVC of each of the queries is an initial record for the subset returned for that query, and where the records in each of the subsets are consecutive according to the alphabetic order starting from the initial record for that subset. The threads within the multi-thread execution 140 in FIG. 1 illustrate examples of the plurality of threads.

As discussed above, while some implementations use RVC based queries (for queries other than Query 0) that include the unique values in the selected one (e.g., the selected field 172) of the sequence of fields (e.g., fields in the primary key 1068) and the next one (e.g., the next field 174) of the sequence of fields to improve efficiency, alternative implementations use RVC based queries (for queries other than query 0) that include the selected one (e.g., the selected field 172) of the sequence of fields (e.g., fields in the primary key 1068) and not the next one (e.g., the next field 174) of the sequence of fields (that is, the plurality of records is split into the subsets based on the unique values in the selected one of the sequence of fields and based on the next one of the sequence of fields).

In some implementations, to deduplicate the another plurality of records, the operations in reference 608 includes identifying, by each thread within the plurality of threads during operating on a subset of the plurality of records, two or more duplicate candidates within that subset for a specific one of the unique values based on that the respective values of the next one of the sequence of fields within the two or more duplicate candidates are matched. In some implementations, responsive to the executing of the plurality of threads, the identifiers copied into at least two of the plurality of records that were determined to be duplicate candidates are received at reference 654. Records 1061, 1062, and 1063 are examples of duplicate candidates as their values within the next field are the same for the selected field value being 0. The matching to identifying the duplicate candidates are referred to as "shallow matching" as discussed above.

To deduplicate the another plurality of records, the flow continues to reference 656, where specific records within the another plurality of records corresponding to the duplicate candidates are identified based on the received identifiers. Records 1022, 1024, and 1026 within records 102 are identified corresponding to the duplicate candidates, records 1061, 1062, and 1063 based on the respective identifiers in the example in FIG. 2 as discussed above.

The flow then continues to reference 658, where two or more of the specific records are determined to be duplicates based on a result of a match operation on values in two or more fields of the specific records. For example, the result may be that full values for two or more fields of the two or more records are matched. Records 1022 and 1026 are examples of the two or more records, and the matching to identify the duplicates within records 102 are referred to as "deep matching" as discussed above.

The flow then continues to reference 659, where at least one of the two or more records within the another plurality of records is removed. Record 1022 is an example of the removed record as discussed above.

Exemplary Deployments

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

While the exemplary implementations may include an on-demand database service environment provided by an application server with a front end for an on-demand database service capable of supporting multiple tenants, alternative implementations are within the spirit and scope of the appended claims (e.g., other database architectures may be used, such as ORACLE® or DB2® by IBM).

A "reference" refers to a piece of data usable to locate a data structure and may be implemented a variety of ways (e.g., a pointer, an index, a handle, a key, an identifier, etc.)

The term "query plan" generally refers to one or more operations used to access information in a database management system.

Receipt of data by the system may occur differently in different implementations (e.g., it may be pushed to the system (often referred to as a push model), pulled by the system (often referred to as a pull model), etc.)

A dataset may be stored in a flat database structure (e.g., a single table (or database object) or as a single record, which is separated by delimiters, such as tabs or commas (e.g., Comma-Separated Values (CSV) or JavaScript Object Notation (JSON) file)), a set of relational database tables (or database objects) or in another type of database structure or data format.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

A "user profile" or "user's profile" is generally configured to store and maintain data about a given user. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the multi-tenant system that provides a service.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 7A:
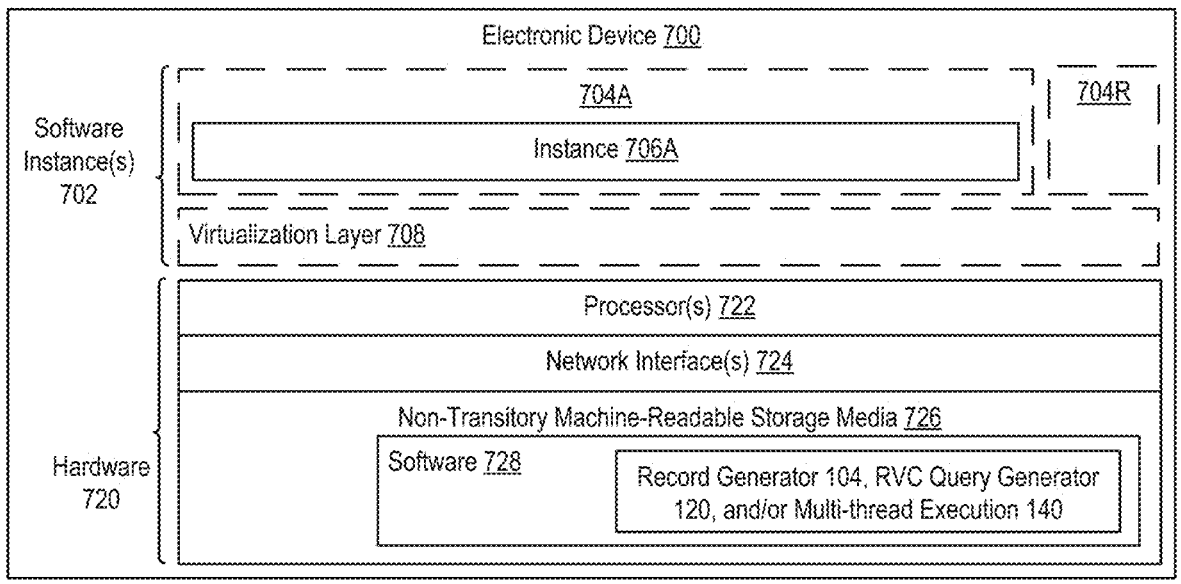
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). In one implementation: 1) each of the end user clients is implemented in a separate one of the electronic devices 700 (e.g., in user electronic devices operated by users where the software 728 represents the software to implement end user clients to interface with the record generator 104, the RVC query generator 120, multi-thread execution 140, and/or other software modules for the deduplication service platform 200 (e.g., a web browser, a native client, a portal, a command-line interface, and/or an application program interface (API) based upon protocols such as Simple Object Access Protocol (SOAP), Representational State Transfer (REST), etc.)); 2) the record generator 104, the RVC query generator 120, multi-thread execution 140, and/or other software modules/hardware circuits for the deduplication service platform 200 are implemented in a separate set of one or more of the electronic devices 700 (e.g., a set of one or more server electronic devices where the software 728 includes the software to implement the record generator 104, the RVC query generator 120, multi-thread execution 140, and/or other software modules for the deduplication service platform 200); and 3) in operation, the electronic devices implementing the end user clients and the deduplication service platform 200 would be communicatively coupled (e.g., by a network) and would establish between them (or through one or more other layers) connections for submitting requests for record deduplication and/or RVC based query generation to the record generator 104, the RVC query generator 120, multi-thread execution 140, and/or other software modules/hardware circuits for the deduplication service platform 200, and returning records with duplication being removed. Other configurations of electronic devices may be used in other implementations (e.g., an implementation in which the end user client and the record generator 104, the RVC query generator 120, multi-thread execution 140, and/or other software modules for the deduplication service platform 200 are implemented on a single electronic device 700).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

Figure 7B:
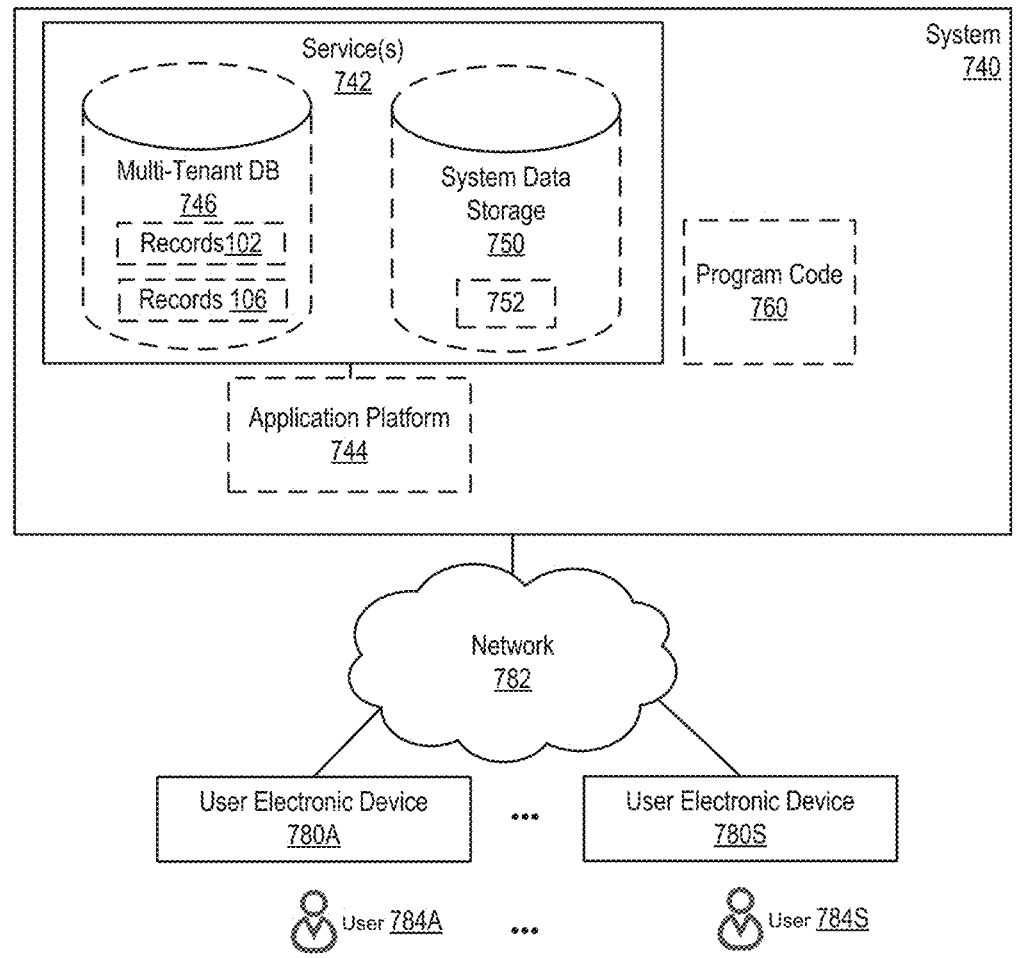
FIG. 7B is a block diagram of an environment where one or more of a schema builder, a payload builder, and an API tester may be deployed, according to some implementations.

FIG. 7B is a block diagram of an environment where the record generator 104, the RVC query generator 120, multi-thread execution 140, and/or other software modules/hardware circuits for the deduplication service platform 200 may be deployed, according to some implementations. A system 740 includes hardware (a set of one or more electronic devices) and software to provide service(s) 742, including the record generator 104, the RVC query generator 120, multi-thread execution 140, and/or other software modules/hardware circuits for the deduplication service platform 200. The system 740 is coupled to user electronic devices 780A-S over a network 782. The service(s) 742 may be on-demand services that are made available to one or more of the users 784A-S working for one or more other organizations (sometimes referred to as outside users) so that those organizations do not need to necessarily be concerned with building and/or maintaining a system, but instead makes use of the service(s) 742 when needed (e.g., on the demand of the users 784A-S). The service(s) 742 may communicate with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services, such as the deduplication service (including the record generator 104, the RVC query generator 120, multi-thread execution 140, and/or other software modules/hardware circuits for the deduplication service platform 200), a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 1040 via one or more of user electronic devices 780A-S.

In some implementations, one or more of the service(s) 742 may utilize one or more multi-tenant databases 746, as well as system data storage 750 for system data 752 accessible to system 740. The one or more multi-tenant databases 746 may store records 102 and records 106 discussed herein above. In certain implementations, the system 740 includes a set of one or more servers that are running on server electronic devices and that are configured to handle requests for any authorized user associated with any tenant (there is no server affinity for a user and/or tenant to a specific server). In some implementations, the set of one or more servers are the ones that add the records 106, generate the RVC based queries, and merge records as discussed above relating to FIGS. 1 and 2. The user electronic devices 780A-S communicate with the server(s) of system 740 to request and update tenant-level data and system-level data hosted by system 740, and in response the system 740 (e.g., one or more servers in system 740) may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the deduplication service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages and applications available to it from system 740 over network 782.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation.

Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for splitting a plurality of records into subsets for parallel processing by separate threads, the method comprising:
receiving a request to add a plurality records to a database, wherein the plurality of records have the same plurality of fields, wherein two or more of the plurality of fields form a primary key and the records are in an order according to a stored value in each of the fields, the receiving including,
tracking, for each unique value found in the plurality of records within a selected one of the fields, a statistic based on the values found in the plurality of records within an other of the fields of the plurality of records;
generating a plurality of queries to process the request, wherein the processing includes applying a row value constructor (RVC) function with a logical operation, a specific one of the unique values found within the selected one of the fields, and, for that specific value, the tracked statistic for the other of the fields to identify a first one of the records in the order whose values for those fields meet the logical operation; and
causing a plurality of threads to execute that each submit one of the queries and operate on a subset of the plurality of records responsive to execution of that query.

2. The method of claim 1, wherein the statistic is one of the values in the other of the fields.

3. The method of claim 1, wherein the first one of the records identified by the RVC function is an initial record for the subset returned for that query.

4. The method of claim 3, wherein the records in the subset are consecutive according to the order starting from the initial record for the subset.

5. The method of claim 1, further comprising:
generating an initial query including a RVC function with a logical operation, a specific one of the unique values found within the selected one of the fields without a respective tracked statistic for the other of the fields.

6. The method of claim 1, wherein the plurality of records is split into the subsets based on the unique values in the selected one of the fields and based on the other of the fields.

7. The method of claim 1, wherein the RVC function includes values for all but one of the fields.

8. The method of claim 1, wherein the fields include one or more fields that are earlier in the fields than the selected one of the fields, and wherein the RVC function includes a value for each of the one or more fields that are earlier in the fields.

9. The method of claim 1, wherein the statistic, for each unique value found in the plurality of records within a selected one of the fields, is a maximum value found in the plurality of records within the other of the fields.

10. The method of claim 1, the receiving comprising:
indexing another plurality of records through application of a set of one or more match keys, wherein each of the match keys identifies one or more fields of the another plurality of records from which identified parts are to be copied during the adding, wherein each of the another plurality of records includes an identifier, and wherein the adding includes, for each of the another plurality of records and for each of the set of match keys, and adding one record to the plurality of records that includes the parts identified by that match key from that one of the another plurality of records and the identifier from that one of the another plurality of records.

11. The method of claim 1, further comprising:
deduplicating another plurality of records by,
indexing the another plurality of records through application of a set of one or more match keys, wherein each of the match keys identifies one or more fields of the another plurality of records from which identified parts are to be copied, wherein identifiers of each of the another plurality of records, along with the identified parts, are copied to respective records within the plurality of records;
receiving the identifiers copied into at least two of the plurality of records that were determined to be duplicate candidates responsive to the executing of the plurality of threads;
identifying specific records within the another plurality of records corresponding to the duplicate candidates based on the received identifiers;
determining that two or more of the specific records are duplicates based on a result of a match operation on values in two or more fields of the specific records; and
removing at least one of the two or more records within the another plurality of records.

12. A non-transitory machine-readable storage medium that provides instructions for splitting a plurality of records into subsets for parallel processing by separate threads, wherein the instructions, when executed by a processor, cause said processor to perform operations comprising:
receiving a request to add a plurality records to a database, wherein the plurality of records have the same plurality of fields, wherein two or more of the plurality of fields form a primary key and the records are in an order according to a stored value in each of the fields, the receiving including,
tracking, for each unique value found in the plurality of records within a selected one of the fields, a statistic based on the values found in the plurality of records within an other of the fields of the plurality of records;
generating a plurality of queries to process the request, wherein the processing includes applying a row value constructor (RVC) function with a logical operation, a specific one of the unique values found within the selected one of the fields, and, for that specific value, the tracked statistic for the other of the fields to identify a first one of the records in the order whose values for those fields meet the logical operation; and
causing a plurality of threads to execute that each submit one of the queries and operate on a subset of the plurality of records responsive to execution of that query.

13. The non-transitory machine-readable storage medium of claim 12, further comprising:
generating an initial query including a RVC function with a logical operation, a specific one of the unique values found within the selected one of the fields without a respective tracked statistic for the other of the fields.

14. An apparatus comprising:
a processor and a non-transitory machine-readable storage medium that provides instructions for splitting a plurality of records into subsets for parallel processing by separate threads, wherein the instructions, when executed by the processor, cause the processor to perform operations comprising:
receiving a request to add a plurality records to a database, wherein the plurality of records have the same plurality of fields, wherein two or more of the plurality of fields form a primary key and the records are in an order according to a stored value in each of the fields, the receiving including,
tracking, for each unique value found in the plurality of records within a selected one of the fields, a statistic based on the values found in the plurality of records within an other of the fields;
generating a plurality of queries to process the request, wherein the processing includes applying a row value constructor (RVC) function with a logical operation, a specific one of the unique values found within the selected one of the fields, and, for that specific value, the tracked statistic for the other of the fields to identify a first one of the records in the order whose values for those fields meet the logical operation; and
causing a plurality of threads to execute that each submit one of the queries and operate on a subset of the plurality of records responsive to execution of that query.

15. The apparatus of claim 14, wherein the statistic is one of the values in the other of the fields.

16. The apparatus of claim 14, wherein the first one of the records identified by the RVC function is an initial record for the subset returned for that query.

17. The apparatus of claim 14, the operations further comprising:
generating an initial query including a RVC function with a logical operation, a specific one of the unique values found within the selected one of the fields without a respective tracked statistic for the other of the fields.

18. The apparatus of claim 14, wherein the statistic, for each unique value found in the plurality of records within a selected one of the fields, is a maximum value found in the plurality of records within the other of the fields.

19. The apparatus of claim 14, the receiving comprising:
indexing another plurality of records through application of a set of one or more match keys, wherein each of the match keys identifies one or more fields of the another plurality of records from which identified parts are to be copied during the adding, wherein each of the another plurality of records includes an identifier, and wherein the adding includes, for each of the another plurality of records and for each of the set of match keys, and adding one record to the plurality of records that includes the parts identified by that match key from that one of the another plurality of records and the identifier from that one of the another plurality of records.

20. The apparatus of claim 14, the operations further comprising:
deduplicating another plurality of records by, indexing the another plurality of records through application of a set of one or more match keys, wherein each of the match keys identifies one or more fields of the another plurality of records from which identified parts are to be copied, wherein identifiers of the another plurality of records, along with the identified parts, are copied to respective records within the plurality of records;

receiving the identifiers copied into at least two of the plurality of records that were determined to be duplicate candidates responsive to the executing of the plurality of threads;

identifying specific records within the another plurality of records corresponding to the duplicate candidates based on the received identifiers;

determining that two or more of the specific records are duplicates based on a result of a match operation on values in two or more fields of the specific records; and removing at least one of the two or more records within the another plurality of records.

* * * * *